United States Defensive Publication [19] (H)

[11] T103,702

Willcox et al.

[43] Dec. 6, 1983

[54] STABILIZATION OF POLYMER BLENDS WITH METAL NITRITES

[76] Inventors: Kenneth W. Willcox; James N. Short, both c/o Phillips Petroleum Company, Bartlesville, Okla. 74004

[21] Appl. No.: 403,982

[22] Filed: Aug. 2, 1982

[51] Int. Cl.[3] ..... C08K 3/2 8; C08K 3/10

[52] U.S. Cl. ..... 524/429; 524/443; 524/456; 524/612; 525/95

[57] ABSTRACT

An alkali metal or alkaline earth metal nitrite is added to a polymer blend comprising (1) block copolymer formed from monovinyl-substituted aromatic hydrocarbon monomer and a conjugated diene monomer and (2) styrene polymer to improve thermal stability and to inhibit gel and fisheye formation.

28 Claims, No Sheets Drawing,

17 Pages Specification

The file of this unexamined application may be inspected and copies thereof may be purchased (849 O.G. 1221, Apr. 9, 1968).